United States Patent Office
3,076,795
Patented Feb. 5, 1963

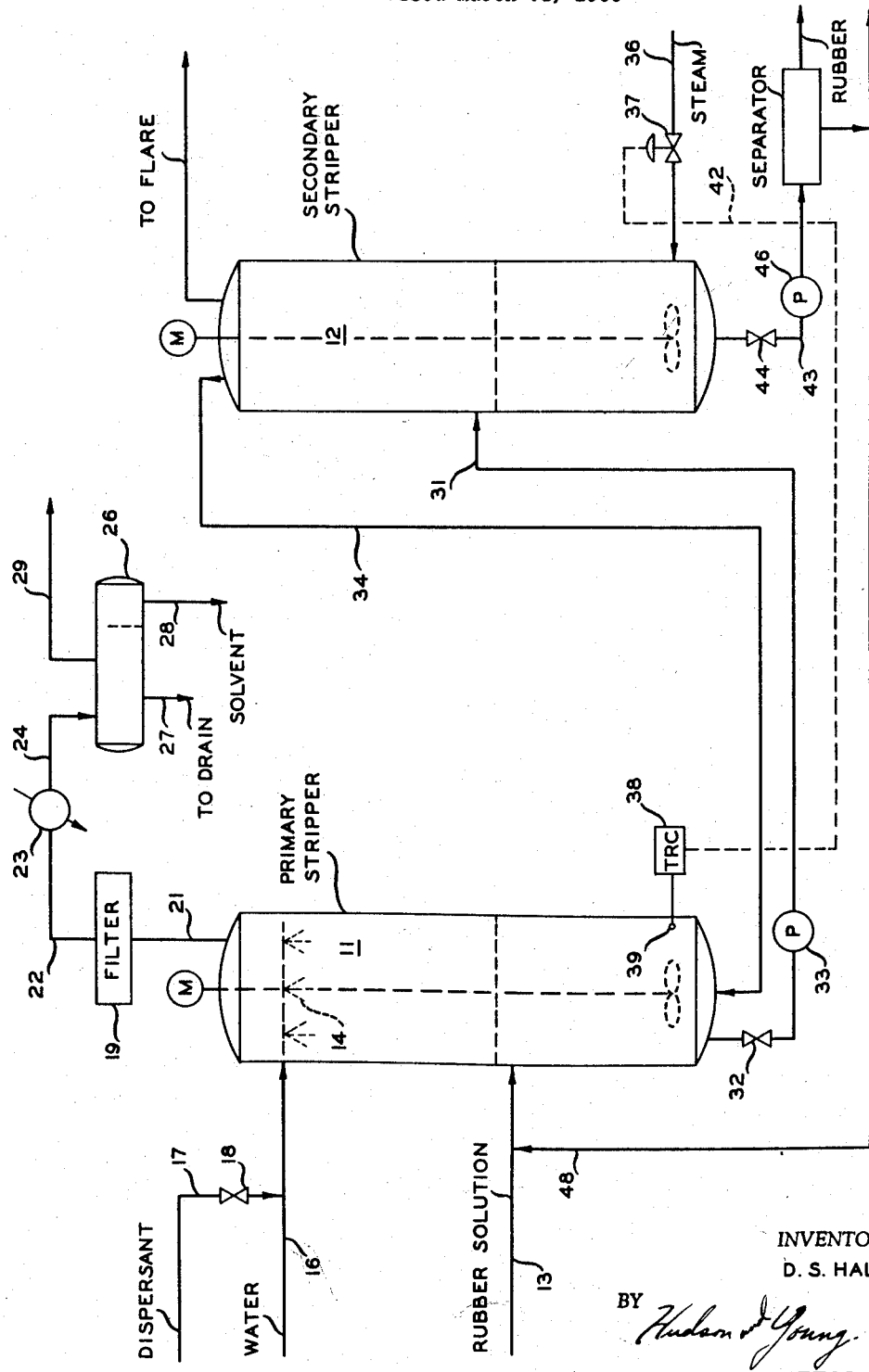

3,076,795
RECOVERY OF POLYMERS FROM SOLUTION
Dick S. Hall, Bartlesville, Okla., assignor to Phillips Petroleum Company, a corporation of Delaware
Filed Mar. 31, 1960, Ser. No. 18,990
4 Claims. (Cl. 260—94.7)

This invention relates to recovery of polymers from solution.

In recent years a great deal of work has been done in the development of new types of polymeric materials, primarily rubbery materials, wherein the polymer is produced in the presence of organometal initiators. The products of such polymerization processes are recovered from the polymerization zone as a solution in a hydrocarbon solvent.

The present invention relates to a method of recovering the polymer in crumb form from such a solution. The process results in the production of a slurry of the rubbery polymer which is easily handled in subsequent washing and drying operations. The process is an improvement over simple solvent removal by heating because removal of the solvent in this manner is difficult when the solution becomes concentrated and because the rubber is obtained in a large mass which is difficult to handle.

The following are objects of this invention.

An object of my invention is to provide a steam stripping process for the recovery of rubber from solutions thereof in a hydrocarbon solvent. A further object of my invention is to provide apparatus for carrying out this process.

Other objects and advantages of my invention will be apparent to one skilled in the art upon reading this disclosure.

A drawing illustrating my invention in schematic form forms a part of this application.

Broadly, one aspect of my invention resides in a 2-stage steam stripping process for recovering rubber in crumb form from a solution thereof. More particularly, the invention resides in a process for recovering cis-polybutadiene from a solution thereof in toluene comprising introducing said solution into a first stripping zone; supplying water to said first stripping zone; supplying heat to said first stripping zone as hereinafter described; removing a mixture of tolene and water as an overhead product of said first stripping zone; removing a mixture of rubber crumb, toluene, and water as a bottom product of said first stripping zone; passing said bottom product to a second stripping zone; removing an overhead vapor product from said second stripping zone and passing same to said first stripping zone, said vapor product being the principal source of heat supplied to said first stripping zone; heating said second stripping zone by supplying steam thereto in an amount sufficient to maintain a predetermined temperature in said first stripping zone; removing a slurry of rubber crumb in water from the bottom portion of said second stripping zone; and separating water from said crumb.

Another aspect of my invention resides in apparatus for steam stripping comprising a first stripper and a second stripper, a feed conduit extending into said first stripper, a vapor removal conduit extending from the upper end portion of said first stripper, a conduit extending from the lower end portion of said first stripper to said second stripper, a conduit extending from the upper end portion of said second stripper to the lower end portion of said first stripper, a conduit extending from the lower end portion of said second stripper, a steam supply conduit communicating with the lower end portion of said second stripper, and means to control flow in said last mentioned conduit in response to the temperature in said first stripper.

By using the process of my invention it is possible to operate both steam stripping zones at elevated temperatures and pressures and, in fact, the second stripper can be operated at a higher temperature and pressure than the first. This permits use of the vapors from the second stage as the heating medium and stripping gas for the first stage. Operating with a low temperature in the first stage reduces the ratio of water to solvent in the overhead vapors from this stage and this eliminates some of the load on the vapor recovery system. Using a higher temperature in the second stage causes good diffusion of solvent from the rubber particles.

An additional important feature of my process resides in the feature of controlling the steam rate to the second stage stripper in response to the temperature in the first stage. This provides comparatively constant operation of the stripping zones even when the amount of solution fed to the stripping zones varies considerably.

The system should be operated to give a solvent content in the rubber from the second stage below 1 percent. Operating the first stage at approximately 200° F. and the second stage at approximately 220° F., it is possible to produce a product having a solvent content in the range of 0.5 to 0.8 weight percent. Raising the temperature in the first stage to 208° F. will reduce the solvent content of the second stage product to not more than 0.003 weight percent. In the 2-stage operation, it is preferable to operate the second stage at 1.5 to 5 p.s.i.g. above the pressure of the first stage. Since the second stage operates at the higher pressure, it is necessary to pump the rubber-water slurry to the second stage.

Apparatus in which the present invention can be carried out is shown in the accompanying drawing. The drawing shows a primary stripper 11 and a secondary stripper 12, each stripper being provided with stirring means but otherwise substantially unobstructed. Rubber solution supply conduit 13 extends to an intermediate portion of primary stripper 11. In the upper portion of this stripper 11 there are provided spray nozzles 14, these being connected to a water supply conduit 16. Communicating with conduit 16 is a dispersant supply conduit 17 having valve 18 therein. Filter 19 is provided, this filter being connected to the upper end portion of stripper 11 by conduit 21. Conduit 22 extends from filter 19 to condenser 23 and conduit 24 extends from condenser 23 to phase separator 26. Phase separator 26 is provided with a water removal conduit 27, a solvent removal conduit 28 and a conduit 29 extending to a flare (not shown). Conduit 31 extends from the lower end portion of stripper 11 to an intermediate portion of stripper 12, this conduit having valve 32 and pump 33 therein. Conduit 34 extends from the upper end portion of stripper 12 to the lower end portion of stripper 11. Steam supply conduit 36 extends into the lower end portion of stripper 12, this conduit being provided with motor valve 37 therein. A temperature recorder controller 38 is connected to temperature sensing means 39 in the lower portion of stripper 11 and the output from controller 38 is operatively connected to motor valve 37 by conduit 42. Conduit 43, having valve 44 and pump 46 therein, extends from the lower end portion of stripper 12 to a separator. Conduit 48 provides water recycle from the separator to stripper 11.

In this system, it is possible to recover rubber crumb from various types of rubber in solution. These rubbery polymers are prepared by polymerizing a monomer system containing a single monomer or a mixture containing at least a major portion of conjugated dienes containing 4 to 8 carbon atoms. Examples of conjugated dienes which can be used include 1,3-butadiene, isoprene, 2,3-dimethylbutadiene, 2-methoxybutadiene, 1,3-hexadiene, and 1,3-octadiene. These conjugated dienes can be polymerized either alone or in admixture with each other and/or with one or more other compounds containing an active $CH_2=C<$ group which are copolymerizable therewith. Suitable comonomers containing this group include styrene, acrylonitrile, methyl acrylate, methyl methacrylate, vinyl chloride, methyl vinyl ether, ethylene, propylene, 1-butene, 1-propene, 1-octene and the like. Preferably, at least 70 percent conjugated diene by weight is used in the monomer mixture when copolymers are prepared.

The polymers are prepared in the presence of organic solvents including paraffins, cycloparaffins and aromatic hydrocarbons which are relatively inert, non-deleterious and liquid under the conditions of the process. Example includes the lower molecular weight alkanes, such as propane, butane, pentane, the higher molecular weight paraffins and cycloparaffins, such as isooctane, cyclohexane, methylcyclohexane, and aromatic compounds, such as benezen, toluene, and the like.

A large number of initiator systems are suitable for the production of the polymers.

One type of initiator system is a two or more component catalyst wherein one component is an organometal compound, including those where one or more organo groups is replaced by a halogen; a metal hydride; or a metal of group I, II or III; and the second component is a group IV to VI compound, e.g., salt or alcoholate. This type of initiator system is fully described with a group of examples in columns 5 through 8 of Patent No. 2,886,561 dated May 12, 1959.

Another initiator system which is suitable involves the use of a compound of the formula $R(Li)_x$, wherein R is a hydrocarbon radical selected from the group consisting of aliphatic, cycloaliphatic and aromatic radicals and combinations of these radicals and $x$ is an integer from 1 to 4, inclusive. The aliphatic and cycloaliphatic radicals can be saturated or contain olefinic unsaturation. The R in the formula has a valence equal to the integer, and preferably contains from 1 to 20, inclusive, carbon atoms, although it is within the scope of the invention to use higher molecular weight compounds. Examples of these compounds include methyllithium, isopropyllithium, n-butyllithium, tert-octyllithium, n-decyllithium, phenyllithium, naphthyllithium, 4-butylphenyllithium, p-tolyllithium, 4-phenylbutyllithium, cyclohexyllithium, 4-butylcyclohexyllithium, 4-cyclohexylbutyllithium, dilithiomethane, 1,4-dilithiobutane, 1,10-dilithiodecane, 1,20 dilithioeicosane, 1,4-dilithiocyclohexane, 1,4-dilithio-2-butene, 1,8-dilithio-3-decene, 1,4-dilithiobenzene, 1,5-dilithionaphthalene, 1,2-dilithio-1,2-diphenylethane, 9,10-dilithio-9,10-dihydroanthracene, 1,2-dilithio-1,8-diphenyloctane, 1,3,5-trilithiopentane, 1,5,15-trilithioeicosane, 1,3,5-trilithiocyclohexane, 1,2,5-trilithionaphthalene, 1,3,5-trilithioanthracene, 1,3,5,8-tetralithiodecane, 1,5,10,20-tetralithioeicosane, 1,2,4,6-tetralithiocyclohexane, 1,2,3,5-tetralithio-4-hexylanthracene, 1,3-dilithio-4-cyclohexene, and the like.

The amount of organolithium initiator employed can vary over a broad range. In general, the amount of initiator used will be in the range from 0.3 to 100 milliequivalents of lithium per 100 parts by weight of total monomers charged and will preferably be in the range from 0.6 to 15 milliequivalents of lithium per 100 parts by weight of total monomers charged. When n-butyllithium is employed as the initiator for the production of an easily processable 40 to 60 Mooney rubber (ML-4 at 212° F.), the quantity of initiator required will generally be in the range from 2 to 2.4 millimoles per 100 parts of total monomers charged.

Still another initiator system utilizes a cobalt compound and a metal alkyl wherein one but not all of the alkyl groups can be replaced by halogen. The Group III metals, as exemplified by aluminum, are used to provide the metal alkyl component. Examples of these organometal compounds include trialkylaluminums, such as triethylaluminum and triisobutylaluminum and alkyl aluminum halides, such as ethylaluminum dichloride and diethylaluminum chloride. For the cobalt compound, the cobaltous form is preferred. Examples of these compounds include cobaltous chloride, cobaltous sulfate, cobaltous nitrate, and the salts of organic acids, such as cobaltous acetate.

Some of the systems included within the above description have been found particularly suitable for the production of polymers having particular molecular configuration. For instance, polybutadiene having 85 to 100 percent of the polymer formed by cis 1,4-addition can be prepared using initiator systems comprising triisobutylaluminum and titanium tetraiodide; triisobutylaluminum, titanium tetrachloride, and iodine; and triisobutylaluminum, titanium tetraiodide, and titanium tetrachloride. Polybutadiene having 70 to 100 percent of the polymer formed by trans-1,4-addition can be prepared using an initiator system comprising lithium aluminum hydride and titanium tetraiodide. The catalyst system comprising lithium aluminum hydride and titanium tetrachloride produces a polybutadiene having a major amount of the polymer formed by 1,2-addition. Similar products are obtained using isoprene except that a portion of the product can be formed by 3,4-addition.

To determine the amount of the addition of the various types, the polymers can be dissolved in carbon disulfide to form a solution having 20 grams of polymer per liter of solution. The infrared spectrum of such a solution (percent transmission) is then determined in a commercial infrared spectrometer.

The percent of the total unsaturation present as trans 1,4- is calculated according to the following equation and consistent units $$\epsilon = \frac{E}{tc}$$

where: $\epsilon$=extinction coefficient (liters - mols$^{-1}$ - microns$^{-1}$); E=extinction (log $I_0/I$); t=path length (microns); and c=concentration (mols double bond/liter). The extinction is determined at the 10.35 micron band and the extinction coefficient used is $1.21 \times 10^{-2}$ (liters-mols$^{-1}$-microns$^{-1}$).

The percent of the total unsaturation present as 1,2- (or vinyl) is calculated according to the above equation, using the 11.0 micron band and an extinction coefficient of $1.52 \times 10^{-2}$ (liters-mols$^{-1}$-microns$^{-1}$).

The percent of the total unsaturation present as cis 1,4- is obtained by subtracting the trans 1,4- and 1,2- (vinyl) determined according to the above methods from the theoretical unsaturation assuming one double bond per each $C_4$ unit in the polymer.

For treatment, it is preferred that the concentration of the polymer in the solvent be in the range of 5 to 10 percent rubber by weight. However, the broader range of 1 to 25 percent rubber is applicable, the higher concentration resulting in greater difficulty in mixing the rubber solution with the water. If effective mixing systems are available, it is quite possible to work with solutions containing 15 percent and higher rubber content.

If problems are encountered because the polymer agglomerates in a sticky mass rather than producing a good crumb during the steam stripping, it is desirable to add an additional material which acts as a dispersant. Suitable dispersants include zinc oxide, alkali metal lignin sulfonates such as sodium and potassium lignin sulfonates, and water soluble saponified polymers of acrylic acid esters.

In the operation of the system shown in the drawing, the rubber solution is introduced into the first stripper by means of conduit 13. Water, containing a dispersant if desired, is introduced into the upper portion of this stripper. Spraying the water against the walls of the stripper by means of sprays 14 prevents polymer deposition thereon. Also, water can be supplied by conduit 48, this water being obtained from the slurry obtained from the second stripper. A slurry of polymer in solvent is pumped to stripper 12 through line 31, this stripper being heated by steam supplied by conduit 36. The temperature in stripper 11 is measured by element 39 and recorder controller 38 controls the amount of this steam. The overhead vapors from stripper 12 are supplied by conduit 34 to primary stripper 11, these vapors constituting the principal source of heat supplied to the primary stripper. The overhead from primary stripper 11 removed by conduit 21 and the components thereof are separated and recovered. The slurry of polymer in water is recovered from stripper 12 by means of conduit 43 and the polymer is separated from the water and dried in conventional equipment.

The following example illustrates operation according to my invention.

EXAMPLE

A solution of cis-polybutadiene in toluene was treated according to the system shown in the drawing. The polymer was formed by 95 percent of cis 1,4- addition in the presence of an initiator system comprising triisobutylaluminum, titanium tetrachloride, and titanium tetraiodide. Rosin acid was used to short-stop the polymerization and 2,2'-methylene bis(4-methyl-6-tertiarybutylphenol) was added as an antioxidant. The solution was then fed to the stripping system of this invention. Primary stripper 11 was operated at 15 p.s.i.a. and 200° F. Secondary stripper 12 was operated at 18 p.s.i.a. and 220° F. A material balance for this recovery is shown in the following table, all amounts being given in pounds:

Table I

| Conduit | 13 | 48 | 16 | 17 | 22 | 34 | 31 |
|---|---|---|---|---|---|---|---|
| Butadiene | 206 | | | | 206 | | |
| Butadiene Impurities | 53 | | | | 53 | | |
| Toluene | 801,539 | 346 | | | 801,745 | 13,750 | 13,890 |
| Water | | 2,366,409 | 80,640 | 1,683 | 517,200 | 803,979 | 2,735,511 |
| Polymer | 138,942 | | | | | | 138,942 |
| Antioxidant | 349 | | | | | | 349 |
| Rosin Acid | 2,886 | | | | | | 2,886 |
| Catalyst Residue | 1,275 | | | | | | 999 |
| Heavies | 1,390 | | | | 695 | | 695 |
| Halides | | | | | | | 298 |
| Dispersant (Tamol 731) | | | | 561 | | | |

The recovery process of this invention is applicable to the recovery of many different rubbery polymers from solution. One particular polymer is the butadiene polymer formed by cis 1,4-addition in the presence of an initiator system comprising triisobutylaluminum, titanium tetrachloride, and titanium tetraiodide. This polymer is produced in a polymerization zone operated at 30 to 40° F. and a pressure of 65 p.s.i.a. At the end of this series of reactors the reaction is shortstopped by the addition of rosin acid and 2,2'-methylene bis(4-methyl-6-tertiarybutylphenol) added as an antioxidant. Some of the solvent is removed in a series of three flash zones operated at 227 to 235° F. and a pressure of 16 p.s.i.a. This solution is mixed with water and fed to the first stripper.

Those skilled in the art will recognize that a variety of pressure and temperature conditions can be used in the strippers. Broadly, I prefer to operate the first stripper within the range of 165 to 225° F. and a pressure of 5 to 25 p.s.i.a. with the second stripper operating at a temperature of 214 to 245° F. and a pressure 1.5 to 5 p.s.i. higher than that selected for the first stripper. Preferred conditions for the first stripper include a temperature range of 180 to 210° F. with a pressure of 10 to 20 p.s.i.a. and, in the second stripper, a temperature of 217 to 230° F. with a pressure 1.5 to 5 p.s.i. higher than that selected for the first stripper.

As many possible embodiments can be made of this invention without departing from the scope thereof, it is to be understood that all matter herein set forth is to be interpreted as illustrative and not as unduly limiting the invention.

I claim:

1. A process for recovering a polymer selected from the group consisting of cis-polybutadiene, trans-polybutadiene, cis-polyisoprene, and transpolyisoprene from a solution of said polymer in a solvent comprising introducing said solution into a first substantially unobstructed stripping zone operated at a temperature of 165 to 225° F. with a pressure of 5 to 25 p.s.i.a.; supplying water to said first stripping zone; supplying heat to said first stripping zone as hereinafter described; removing a mixture of solvent and water as an overhead product of said first stripping zone; removing a mixture of rubber crumb, solvent, and water as a bottom product of said first stripping zone; passing said bottom product to a second substantially unobstructed stripping zone operated at a temperature of 214 to 245° F. with a pressure 1.5 to 5 p.s.i. higher than that used in said first stripping zone; removing an overhead vapor product from said second stripping zone and passing same to said first stripping zone, said vapor product being the principal source of heat supplied to said first stripping zone; heating said second stripping zone by supplying steam thereto in an amount sufficient to maintain a predetermined temperature in said first stripping zone; removing a slurry of rubber crumb in water from the bottom portion of said second stripping zone; and separating water from said crumb.

2. A process for recovering cis-polybutadiene from a solution thereof in toluene comprising introducing said solution into a first stripping zone operated at a temperature of 165 to 225° F. with a pressure of 5 to 25 p.s.i.a.; supplying water to said first substantially unobstructed stripping zone; supplying heat to said first stripping zone as hereinafter described; removing a mixture of toluene and water as an overhead product of said first stripping zone; removing a mixture of rubber crumb, toluene, and water as a bottom product of said first stripping zone; passing said bottom product to a second substantially unobstructed stripping zone operated at a temperature of 214 to 245° F. with a pressure 1.5 to 5 p.s.i. higher than that used in said first stripping zone; removing an overhead vapor product from said second stripping zone and passing same to said first stripping zone, said vapor product being the principal source of heat supplied to said first stripping zone; heating said second stripping zone by supplying steam thereto in an amount sufficient to maintain a predetermined temperature in said first stripping zone; removing a slurry of rubber crumb in water from the bottom portion of said second stripping zone; and separating water from said crumb.

3. The method of claim 2 wherein said first stripping zone is operated at a temperature of 180 to 210° F. with a pressure of 10 to 20 p.s.i.a. and the second stripping zone is operated at a temperature of 217 to 230° F. with a pressure 1.5 to 5 p.s.i. higher than that used in the first stripping zone.

4. The method of claim 2 wherein said first stripping zone is operated at a temperature of 200° F. with a pressure of 15 p.s.i.a. and the second stripping zone is operated at a temperature of 220° F. with a pressure of 18 p.s.i.a.

References Cited in the file of this patent

UNITED STATES PATENTS

| | | |
|---|---|---|
| 2,635,073 | McIntire et al. | Apr. 14, 1953 |
| 2,684,326 | Boyd | July 20, 1954 |
| 2,798,031 | Irvine | July 2, 1957 |
| 2,917,437 | Kleiss et al. | Dec. 15, 1959 |
| 2,953,557 | Wride et al. | Sept. 20, 1960 |

FOREIGN PATENTS

| | | |
|---|---|---|
| 209,007 | Australia | June 19, 1957 |
| 130,766 | Australia | Jan. 5, 1959 |